United States Patent [19]
Suzuki et al.

[11] 3,969,771
[45] July 13, 1976

[54] MAGNETIC HEAD WITH SHIELD PLATES FOR RESPECTIVE HEAD ELEMENTS

[75] Inventors: Nobuo Suzuki, Yokosuka; Takao Ketori, Katsuta, both of Japan

[73] Assignee: Hitachi, Ltd., Japan

[22] Filed: Oct. 23, 1973

[21] Appl. No.: 408,259

[30] Foreign Application Priority Data
Oct. 25, 1972 Japan............... 47-122521[U]

[52] U.S. Cl............... 360/121; 360/122; 360/124; 360/129
[51] Int. Cl............... G11b 5/28; G11b 5/10
[58] Field of Search ............ 179/100.2 C; 340/174.1 F; 346/74 MC; 360/121, 122, 124, 125, 129, 128

[56] References Cited
UNITED STATES PATENTS

| | | | |
|---|---|---|---|
| 3,064,333 | 11/1962 | Kristiansen et al. | 179/100.2 C |
| 3,214,746 | 10/1965 | McCreary | 360/124 |
| 3,274,347 | 9/1966 | Page | 179/100.2 C |
| 3,521,006 | 7/1970 | Michael | 179/100.2 C |
| 3,610,839 | 10/1971 | Sand | 360/129 |
| 3,700,828 | 10/1972 | Zacaroli | 360/128 |
| 3,751,599 | 8/1973 | Ogawa et al. | 179/100.2 C |
| 3,781,834 | 12/1973 | Van Ginkel | 360/129 |
| 3,797,031 | 3/1974 | Hashimoto | 360/121 |

*Primary Examiner*—Alfred H. Eddleman
*Attorney, Agent, or Firm*—Craig & Antonelli

[57] ABSTRACT

A magnetic head for recording on and reproducing from a magnetic tape is disclosed in which first and second magnetic head elements aligned in proximity in the direction of the tape feed are contained in a single case, and at least a pair of shield plates are provided for the respective head elements. The first magnetic head element comprises at least one reproducing head core, and the second magnetic head element comprises at least one recording head core, which cores have respective head gaps provided in parallel with each other and contacting the same track on the magnetic tape during its movement. Each of the shield plates has at least a first plate portion perpendicular to the direction of the tape feed disposed between the head elements and a second and a third plate portion extended in parallel with the direction of the tape feed from both ends of the first plate portion when viewed from the tape surface so as to enclose the individual head element at least in three directions, whereby magnetic leakage from one head element to the other during activation thereof is reduced.

4 Claims, 4 Drawing Figures

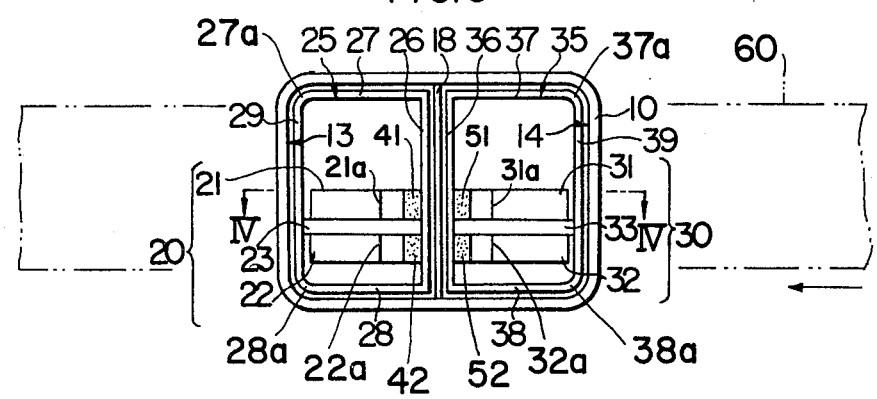
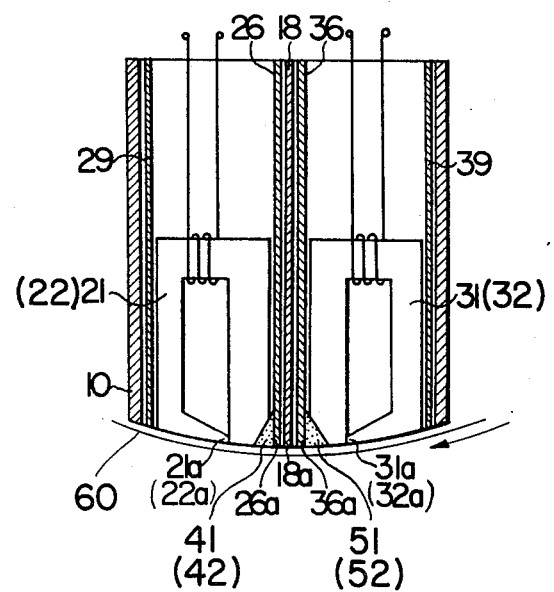

MAGNETIC HEAD WITH SHIELD PLATES FOR RESPECTIVE HEAD ELEMENTS

This invention relates to a magnetic head and more in particular to a pair of magnetic head elements aligned in the direction of tape feed.

A magnetic head is used to record electrical signals in a magnetic tape or reproduce electrical signals recorded therein by contact therewith.

The recent development of the tape recorder is such that a strip of magnetic tape is contained in a housing such as a cassette or cartridge with one side thereof provided with several openings and along which the magnetic tape runs substantially parallelly. Magnetic heads and a capstan are brought into contact with the magnetic tape through these openings. In particular, a magnetic head for both operations of recording and reproduction, contacts with the magnetic tape by the agency of the centrally located one of the openings. A pad is elastically provided on the backside of the central opening behind the magnetic tape and presses the magnetic tape against the magnetic head thereby to achieve a superior contact between the magnetic tape and magnetic head through the central opening.

The use of magnetic tape contained in such housing for recording and reproduction naturally determines the position of the magnetic head. Also, the size of the magnetic head is limited by the size of the opening provided in the housing.

The conventional magnetic head comprises a magnetic head element contained in a head case for performing both recording and reproduction operations, though the two operations cannot be conducted at a time.

Therefore, even if there happens a desirability to accomplish both of the recording and reproducing functions simultaneously on a magnetic tape contained in the cassette or the like, it is impossible to perform both of the functions by means of a single magnetic head element. Thus, it is necessary to provide separate magnetic head elements for recording and reproducing operations, which must inevitably be placed in proximity to each other to allow them to be accomodated in an opening of the cassette, in view of the position of the magnetic head, size of the opening and position of the pad. For this purpose, it is desirable to contain both the magnetic head elements in a common head case. However, the trouble is that when the two magnetic head elements are in recording and reproduction operations respectively simultaneously, magnetic leakage occurs from one head element to the other, with the result that a part of electrical signals to be recorded by one head element is superimposed through such leakage on those electrical signals being reproduced by the other head element through the running magnetic tape, thus causing noises in the reproduction signals. Therefore, it is very important to prevent magnetic leakage from one head to the other.

There is no conventional tape recorder in which a pair of magnetic head elements with different functions placed side by side are contained in a common head case. As far as the inventors know, the only exception may be some magnetic heads used with the data processing system. In this case, however, the problem of such magnetic leakage from one head element to the other is not so serious in view of the fact that the magnetic heads process only digital signals to determine whether they are "1" or "0". Such magnetic leakage poses a problem of noises in the case of analog signals including an audio signal or the like.

An object of the present invention is to provide a magnetic head including a pair of magnetic head elements in which magnetic leakage from one magnetic head element to the other is reduced.

According to the present invention, there is provided a magnetic head for recording on and reproducing from a magnetic tape comprising a head case, a pair of magnetic head elements aligned in proximity to each other within said head case in the direction of feed of the magnetic tape, and a pair of shield plates, each of said shield plates having at least a first plate portion perpendicular to the direction of the tape feed disposed between the head elements and a second and a third plate portion extended in parallel with the direction of the tape feed from the upper and lower ends of the first plate portion, respectively, when viewed from the tape surface so as to enclose the individual head element at least in three directions.

The above and other objects, features and advantages will be made apparent by the detailed description taken in conjunction with the accompanying drawings, in which:

FIG. 3 shows a front view of another embodiment of the invention; and

FIG. 4 is a sectional view taken in line IV—IV in FIG. 3.

Figure 1:
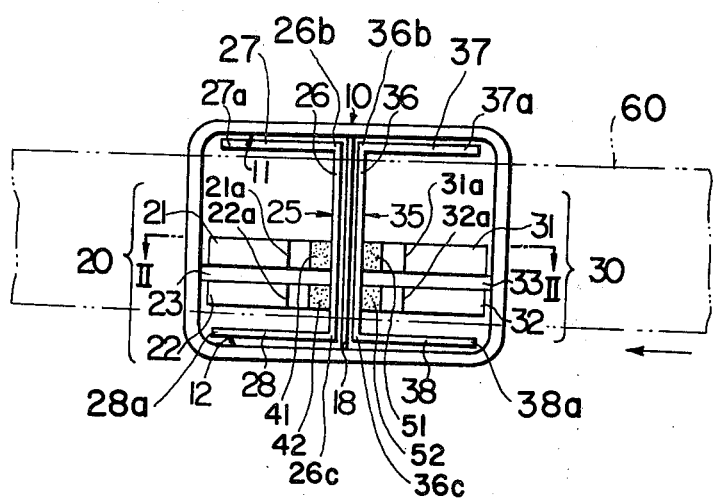
FIG. 1 shows a front view of a magnetic head according to an embodiment of the invention.
Figure 2:
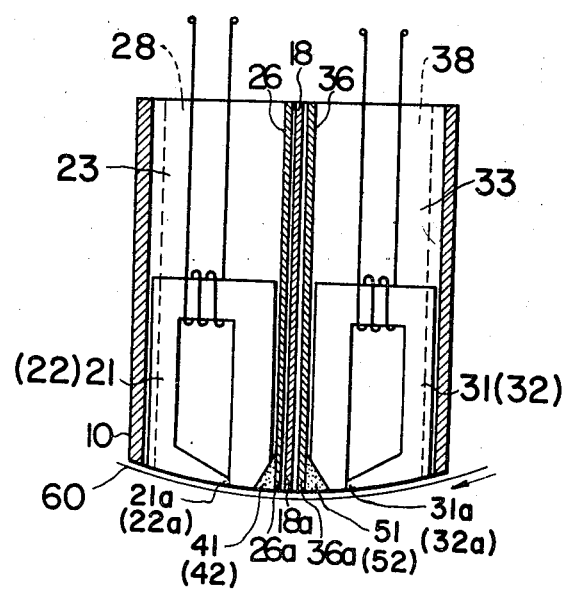
FIG. 2 is a diagram showing a sectional view taken in line II—II in FIG. 1.

Referring to FIGS. 1 and 2 showing an embodiment of the invention, reference numeral 10 shows a head case containing first and second magnetic head elements 20 and 30 adjacent to each other along the direction of tape feed. The first magnetic head element 20 comprises reproducing head cores 21 and 22, while the second magnetic head element 30 includes recording head cores 31 and 32. Among the four head cores 21, 22, 31 and 32, the head cores 21 and 31 are arranged flush with each other at a higher level while the remaining head cores 22 and 32 are also disposed flush with each other at a lower level. The head cores 21 and 31 is adapted to be in contact with one track of the magnetic tape 60, while the head cores 22 and 32 are ready to be in contact with another track of the magnetic tape 60. The tape 60 travels in the direction indicated by the arrow in FIGS. 1 and 2. Shield plates 23 and 33 are inserted between the head cores 21 and 22 and between the head cores 31 and 32 respectively. Substantially at the center of the head case 10 is provided a flat shield plate 18 at right angles with the direction of tape feed for separating the magnetic head elements 20 and 30 laterally. This shield plate 18 corresponds to a shield plate provided in a conventional magnetic head used with a data processing system. This shield plate 18, however, may not necessarily be provided in the present invention. A pair of shield plates 25 and 35 are arranged along the shield plate 18 and the upper and lower sides 11 and 12 of the head case 10, as shown in FIG. 1. Namely, the shield plate 25 comprises a first plate portion 26 perpendicular to the direction of the tape feed disposed between the head cores 21 and 22, and cores 31 and 32, and a second and a third plate portion 27 and 28 extending in parallel with the direction of the tape feed from the upper and lower ends 26b and 26c of the first plate portion 26, which plate portions are integrally formed, for shielding the magnetic head element 20, whereas the shield plate 35 includes a first plate portion 36 perpendicular to the direction of the tape feed disposed between the head cores 21 and 22, and cores 31 and 32, and a second and a third plate portion 37 and 38 extending in parallel with the reverse direction of the tape feed from the upper and lower ends 36b and 36c of the first plate portion 36, which plate portions are integrally formed for shielding the magnetic head element 30. Although not shown in the Figures, dummy cores of magnetic ferrite are inserted into the spaces enclosed by the first plate portion 26, the second plate portion 27, the head core 21 and the case 10 and by the first plate portion 26, the third plate portion 28, the head core 22 and the case 10, and the gaps therebetween are filled with epoxy resin so that the shield plate 25 is fixed in the case 10. The shield plate 35 is also fixed in the same manner.

The first plate portion 26 of the shield plate 25, the shield plate 18 and the first plate portion 36 of the shield plate 35 have extended ends 26a, 18a and 36a respectively extending toward the surface of the magnetic tape beyond the head gaps 21a, 22a, 31a, and 32a of the magnetic head cores 21, 22, 31 and 32, so that glass 41, 42, 51 and 52 or other materials equal or in proximity to head cores 21, 22, 31 and 32 in hardness and coefficient of thermal expansion is filled in the gaps between the magnetic head cores and the extended end portions of the shield plates thereby to form a circular sliding face against the magnetic 60. The magnetic tape 60 runs in the direction indicated by the arrow shown in the figure, i.e. in the direction of from the recording head cores 31 and 32 to the reproducing head cores 21 and 22. Under this condition, magnetic fluxes jumping out of the gaps 31a and 32a of the recording head cores 31 and 32 of the head element 30 move toward the second and third plate portions 37 and 38 through the first plate portion 36 of the shield plate 35 along the shape of the shield plate 35 and back to the magnetic head element 30, resulting in a little leakage of magnetic fluxes occuring from the gaps 31a and 32a to the magnetic head element 20. Also, in view of the fact that the magnetic head element 20 is protected from the magnetic fluxes leaking from the magnetic head element 30 by the shield plate 25, little magnetic fluxes are picked up by the gaps 21a and 22a of the reproducing head cores 21 and 22 of the magnetic head element 20, thus substantially preventing a magnetic leakage from one head element 30 to the other head element 20.

Further, the fact that the extended ends 18a, 26a and 36a of the shield plate 18, the first plate portion 26 of the shield plate 25 and the first plate portion 36 of the shield plate 35 extend to the contact point of the magnetic tape beyond the head gaps 21a, 22a, 31a and 32a of the magnetic head cores 21, 22, 31 and 32 reduces even more the magnetic leakage from one head element to the other through the sheld plate. Furthermore, since the non-magnetic material 41, 42, 51 and 52 having a hardness and coefficient of thermal expansion equal to or approximating that of the magnetic head elements 20 and 30 is filled in the gaps between each of the magnetic head elements 20 and 30 and the extended end of the shield plate group in contact with the magnetic tape 60, thus forming a smooth circular face for contact with the magnetic tape 60, as shown in FIG. 2, the feed of the magnetic tape 60 is smoothed and stabilized.

Referring to FIGS. 3 and 4 showing another embodiment of the invention, the shield plates 25 and 35 symmetrically arranged with respect to the shield plate 18 have, in addition to the portions 27, 28, 37 and 38 as shown in FIG. 1, fourth plate portions 29 and 39 parallelly arranged in proximity to the left side 13 and right side 14 of the head case 10 in the directions at right angles to the portions 27, 28, 37 and 38. Namely, the fourth plate portion 29 of the shield plate 25 is arranged perpendicularly with respect to the direction of the tape feed and extends from the free end 27a (FIG. 1) of the second plate portion 27 to the free end 28a (FIG. 1) of the third plate portion 28, and the fourth plate portion 39 of the shield plate 35 is arranged perpendicularly with respect to the direction of the tape feed and extends from the free end 37a (FIG. 1) of the second plate portion 37 to the free end 38a (FIG.1) of the third plate portion 38. The fourth plate portion is formed integrally with the other plate portions. The magnetic head elements 20 and 30 are thus covered independently of each other inside of the head case for further reduction of a magnetic leakage.

Even though the above-mentioned embodiments involve two head cores in each magnetic head element, the invention is applied with equal effect to any number of head cores depending on the number of tracks of the tape used.

What we claim is:
1. A magnetic head assembly for recording on and reproducing from a magnetic tape comprising:
 a head case;
 a first and a second magnetic head element aligned with each other along the direction of the tape feed within said head case,
 said first magnetic head element comprising at least one reproducing head core,
 said second magnetic head element comprising at least one recording head core,
 said reproducing and recording head cores having respective head gaps provided in parallel with each other and contacting the same track on the magnetic tape when it runs; and
 a first and a second shield plate,
 said first shield plate having at least a first plate portion perpendicular to the direction of the tape feed disposed between the head elements and a second and a third plate portion extending in parallel with the direction of the tape feed from both ends of the first plate portion, so as to enclose the first head element at least in three directions, said first, second and third plate portions of the first shield plate being integrally formed,
 said second shield plate having at least a first plate portion perpendicular to the direction of the tape feed disposed between the head elements and a second and a third plate portion extending in parallel with the reverse direction of the tape feed from both ends of the first plate portion so as to enclose the second head element at least in three directions, said first, second and third plate portions of the second shield plate being integrally formed, and wherein
 the first plate portions of said shield plates have respective end portions near the surface of the magnetic tape, said end portions extending approximately to the surface of the magnetic tape farther than the head gaps of the magnetic head cores, and a non-magnetic material having the same or substantially the same hardness and coefficient of thermal expansion as those of the magnetic head cores is filled in the space between said end portions and said magnetic head cores so as to form a smooth circular face for contact with the magnetic tape.

2. A magnetic head assembly for recording on and reproducing from a magnetic tape comprising:
a head case;
a first and a second magnetic head element aligned with each other along the direction of the tape feed within said head case,
said first magnetic head element comprising at least one reproducing head core,
said second magnetic head element comprising at least one recording head core,
said reprodcing and recording head cores having respective head gaps provided in parallel with each other and contacting the same track on the magnetic tape when it runs; and
a first and a second shield plate,
said first shield plate having a first plate portion perpendicular to the direction of the tape feed disposed between the head elements, a second and a third plate portion extending in parallel with the direction of the tape feed from both ends of the first plate portion and a fourth plate portion arranged perpendicularly to the direction of the tape feed and extending from the free end of the second plate portion to the free end of the third plate portion, so as to enclose the first head element in four directions, said first, second third and fourth plate portions being integrally formed, and wherein
the first plate portions of said shield plates have respective end portions near the surface of the magnetic tape, said end portions extending approximately to the surface of the magnetic tape farther than the head gaps of the magnetic head cores, and a non-magnetic material having the same or substantially the same hardness and coefficient of thermal expansion as those of the magnetic head cores is filled in the space between said end portions and said magnetic head cores so as to form a smooth circular face for contact with the magnetic tape.

3. A magnetic head assembly comprising:
a head case having upper, lower and side walls, and a tape engaging face across which a magnetic tape travels;
a first head element including at least one head core with a gap portion therein;
a second head element including at least one head core with a gap portion therein;
said first and second head elements being disposed within said case along the tape travelling direction with their gap portions exposed to the tape at an engaging face of the case in such a manner that the respective gap portions perpendicularly contact the tape in parallel relation therebetween;
a first shield plate disposed within said case between the side walls opposing each other, said first plate being exposed normally to the tape engaging face; and
a pair of second shield plates of generally U-shape configuration and disposed within the case, each said second plate having a vertical portion extending close to and in parallel with the first plate, a pair of horizontal portions extended integrally from upper and lower ends of the vertical portion toward the side wall in a manner to be substantially parallel to the upper and lower walls of the case, the respective portions of each said second shield plate being exposed normally to the tape engaging face at the side edge thereof;
the thus exposed gap portions of the respective head cores as well as the first and second shield plates at the tape engaging face of the case forming a tape engaging surface therewith, whereby effective magnetic flux shielding is attained by the first and second shield plates.

4. A magnetic head assembly according to claim 2, which further comprises filling members of a material having properties similar in hardness and coefficient of thermal expansion of those of the head cores in gaps between the head cores and the extended ends of the shield plates at the tape engaging face of the core.

* * * * *